Dec. 20, 1966    A. DUPONT    3,292,297
EXPANSIBLE FISH HOOK DEVICES
Original Filed April 23, 1962
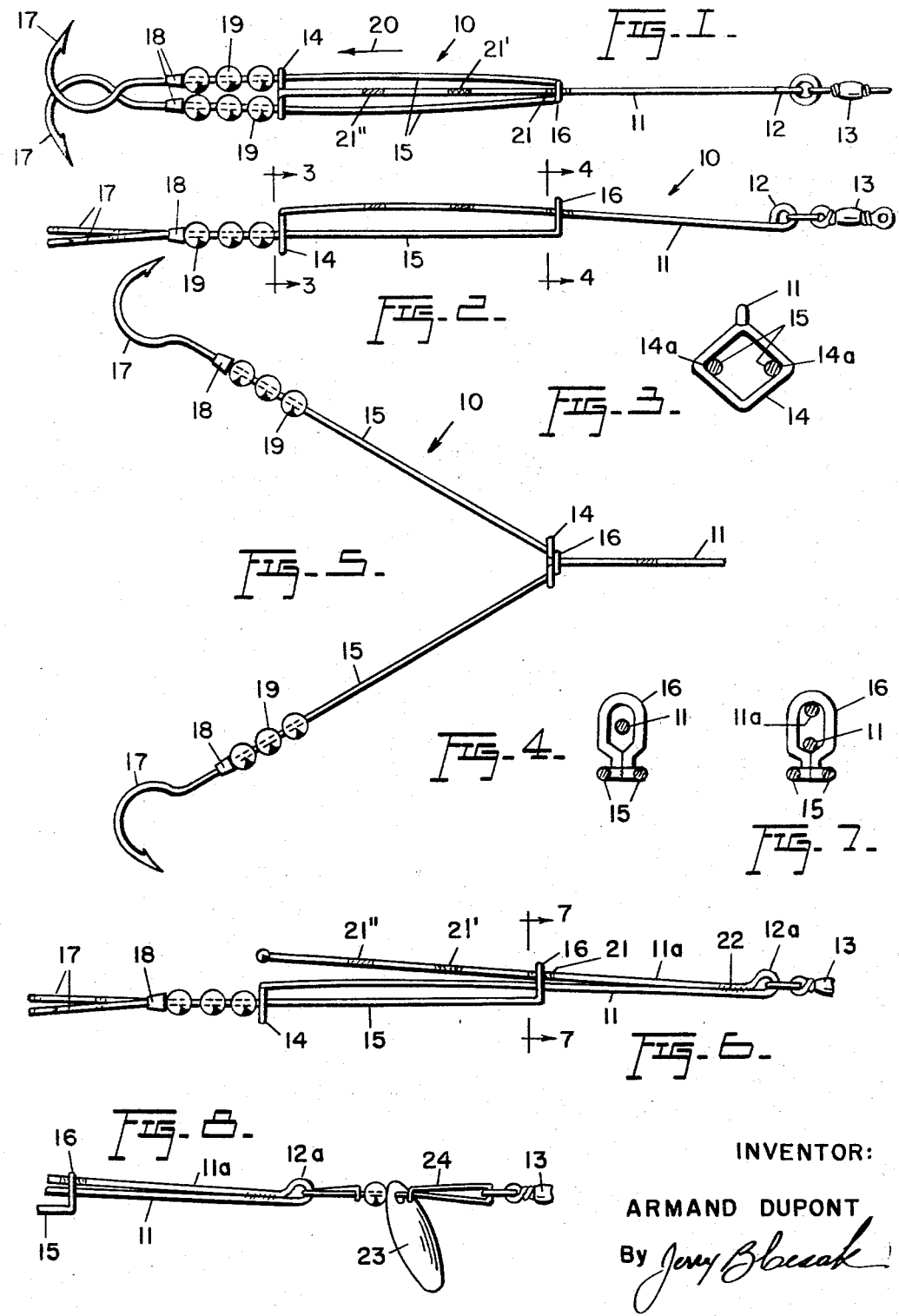
INVENTOR:
ARMAND DUPONT
By Jerry Bbecak United States Patent Office 3,292,297
Patented Dec. 20, 1966

3,292,297
EXPANSIBLE FISH HOOK DEVICES
Armand Dupont, 67 Harris St., Granby, Mass. 01033
Substituted for abandoned application Ser. No. 189,448, Apr. 23, 1962. This application Jan. 2, 1964, Ser. No. 337,706
2 Claims. (Cl. 43—36)

This application is a substitute for my earlier U.S. application Serial No. 189,448, filed April 23, 1962, and abandoned before the filing of this application.

This invention relates to new and useful improvements in fishing devices, more particularly fish hooking devices, and the principal object of the invention is to provide an expansible hook device which may be conveniently and dependably employed for catching fish.

As such, the invention is in the form of a trap hook device which embodies in its construction a set of arms provided with hook members and normally held in a position where the hook members are drawn together, but when a fish bites and a pull is exerted on the device, the arms are automatically resiliently spread apart so that the hook members thereon become firmly embedded in the mouth of the fish. Means are provided for adjusting the device so as to vary the amount of pull or tension which is required before the hook-equipped arms are sprung apart, and the device is also equipped to function effectively as an artificial lure.

Other advantages of the invention reside in its simplicity of construction, efficient and dependable operation, and in its adaptabiltiy to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of the fishing device in accordance with the invention;

FIGURE 2 is a side elevational view thereof;

FIGURE 3 is an enlarged sectional detail, taken substantially in the plane of the line 3—3 in FIGURE 2;

FIGURE 4 is an enlarged sectional detail, taken substantially in the plane of the line 4—4 in FIGURE 2;

FIGURE 5 is a fragmentary top plan view, similar to that shown in FIGURE 1 but illustrating the device in its expanded or spread apart position;

FIGURE 6 is a side elevational view of a modified embodiment of the invention;

FIGURE 7 is an enlarged sectional detail, taken substantially in the plane of the line 7—7 in FIGURE 6; and FIGURE 8 is a fragmentary side elevational view of the device equipped with a spoon attachment.

Referring now to the accompanying drawings in detail, more particularly to FIGURES 1–5, the expansible fish hook device of the invention is designated generally by the reference numeral 10 and embodies in its construction a wire stem 11 which is provided at one end thereof with an eye 12 whereby it may be connected to a fishing line, as for example, by a conventional swivel 13. The other end of the stem 11 has suitably secured thereto or is formed integrally with a laterally projecting loop 14 which, as is shown in FIGURE 3, is substantially diamond-shaped and is disposed in a plane transverse to the axis of the stem.

A pair of wire arms 15 are connected together at one end thereof, either integrally or by soldering, welding, or the like, and are provided at their connected ends with a laterally projecting, elongated eye 16 which slidably receives the stem 11, as is best shown in FIGURE 4. The eye 16 may be formed integrally with the arms or it may be formed separately and suitably secured thereto. In any event, the arms 15 pass through the aforementioned loop 14 and the arms are resilient so that when the loop 14 is disposed adjacent the eye 16 as shown in FIGURE 5, the arms are spread apart in divergent relation, as illustrated. However, when the stem 11 is slid relative to the arms so as to slide the loop 14 along the arms away from the eye 16, the arms will be drawn together by the constricting action of the loop 14, so that the arms assume a retracted or set position, as shown in FIGURE 1.

The free outer ends of the arms 15 are equipped with laterally directed hook members 17 which may be in the form of single, double or treble hooks, or any combination thereof, as desired. These hook members are secured to the ends of the arms 15 in any suitable manner, as for example, by connecting sleeves 18, although simple soldering, welding, or the like, may be utilized. When the arms 15 are drawn together as shown in FIGURES 1 and 2 the hook members 17 may be overlapped without interference with each other.

Flourescent beads 19 are provided on portions of the arms 15 between the sleeves 18 and the loop 14. These beads serve to attract fish to the device in the manner of an artificial lure and moreover, they also serve as stop means to limit the extent of sliding movement of the loop 14 along the arms 15 in the direction of the hook members 17.

It will be observed that when the device is in the position shown in FIGURES 1 and 2, the loop 14 embracing the arms 15 holds the arms drawn together, so that the hook members 17 are retracted. However, when a fish bites on the hooks 17, a pull will be exerted on the arms 15 in the direction of the arrow 20, with respect to the stem 11 which may be either stationary or pulled in the relatively opposite direction by the line to which it is attached. The resilient bias of the arms 15 which urges them to spread apart causes them to frictionally engage the corner portions 14a of the constricting loop 14 and this frictional engagement is sufficiently great to normally prevent sliding of the loop along the arms. However, when the arms are subjected to the aforementioned pull of a biting fish, the frictional resistance of the arms in the loop is overcome, thus causing the arms 15 to slide in the direction of the arrow 20 through the loop 14, while the eye 16 slides in the same direction along the stem 11, until the position of FIGURE 5 is reached where the loop 14 does not exert any constricting action on the arms and the arms are resiliently spread apart to firmly embed the hook members 17 in the mouth of the fish.

The amount of pull or tension which is required to release the arms 15 from the constricting action of the loop 14 may be varied when the device is "set" by setting the eye 16 of the arms 15 closer or further away from the loop 14 of the stem 11, it being apparent that the greater the distance or spacing of the eye 16 from the loop 14 in the set position of the device, the greater is the pull required for releasing. As a matter of convenience, the stem 11 may be provided with colored or other suitable markings 21, 21', 21'', to designate various longitudinally spaced portions of the stem on which the eye 16 of the arms 15 may be set to effect releasing of the arms under various pulling forces. In addition, a further tensioning adjustment may be made by bending the arms 15 at their connected ends at the eye 16, either together or apart, so as to vary their inherent tendency to spring apart upon being drawn together, thus correspondingly varying the frictional engagement of the arms with the corner portions 14a of the loop 14.

The modified embodiment of the invention shown in FIGURES 6 and 7 is the same as the embodiment already described, with exception that additional means are provided for tensioning or adjusting the device for releasing under various pulling forces. These means consist of a tensioning rod 11a which is connected at one end thereof to the stem 11, as for example by soldering, welding, or the like, indicated at 22, although for all practical purposes the rod 11a may be formed integrally with the stem 11 through the medium of the swivel attaching loop 12a, but the connection 22 may still be provided to prevent opening of the loop 12a. Like the stem 11, the rod 11a extends through the eye 16 and the elements 11, 11a are resiliently urged apart so that they frictionally engage the lower and upper portions of the elongated eye 16 as shown in FIGURE 7, and thereby offer a resistance to the sliding of the eye therealong. The frictional engagement of the stem 11 and rod 11a with the eye 16 is, of course, produced by the inherent resiliency of these elements (11 and 11a) which urges the free end of the rod 11a away from the adjacent end of the stem 11, and it will again be apparent that the greater the distance or spacing of the eye 16 from the loop 14, the greater will be the pull required for the arms 15 to be released. In this embodiment of the invention the aforementioned markings 21, 21' and 21" may be provided on the rod 11a and/or on the stem 11, as desired.

Although both embodiments of the invention have been shown as having only two of the arms 15, three or more such arms with hooks thereon may be provided for engagement by the constricting loop. For example, the diamond-shaped loop 14 is capable of accommodating two or four of such arms, as well as three arms, if so desired.

FIGURE 8 illustrates a further adaptation of the device as an artificial lure, wherein a conventional spoon 23 is attached by a suitable clasp 24 interposed between the eye 12a and the swivel 13. Such a spoon attachment may also be used with the embodiment of FIGURES 6 and 7, as well as with that of FIGURES 1–5.

With particular reference again to the embodiment of the invention shown in FIGURES 6 and 7, it will be observed that the elongated eye 16 which is provided at the connected ends of the arms 15 projects therefrom perpendicularly with respect to the plane of the spreading movement of the arms. The arms 15 are frictionally embraced by the loop 14 on the stem 11, while the eye 16 is frictionally engaged by the resilient tensioning rod 11a which is movable in a plane perpendicular to the plane of spreading movement of the arms 15. Thus, the device is tensioned in two planes at right angles to each other, that is, in the plane of movement of the arms 15 and in the plane of movement of the rod 11a, so that the device may be accurately "set" for releasing upon a predetermined amount of pull. It will be also noted that the loop 14, being diamond-shaped as it is, provides "corners" as at 14a which guidingly receive the arms 15 and maintain the arms in proper alignment with each other so that the hooks 17 at the ends of the arms do not interfere with each other when the arms are in their "set" position.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A self-contained expansible fish hook device comprising in combination, a pair of arms connected together at one end thereof and resiliently biased to spread their other ends apart by movement of the arms in a given plane, hook members provided at said other ends of said arms, an elongated eye secured to the connected ends of said arms and projecting therefrom in a plane perpendicular to said given plane of spreading movement of the arms, a stem extending slidably through said eye and having a front end adapted for connection to a fishing line, a loop provided at the rear end of said stem in a plane parallel to said eye, said loop frictionally embracing both said arms at a point spaced longitudinally from said eye and constituting sole means for retaining said arms in a drawn together position, but being slidable along said arms toward said eye during sliding of the stem through the eye whereby to permit the arms to be resiliently spread apart, and a resilient tensioning rod rigidly secured at one end thereof to the front end of said stem and extending slidably through said eye alongside the stem with the inherent resiliency of the rod biasing the same away from the stem in a plane perpendicular to said given plane of spreading movement of said arms, said tensioning rod being of substantially the same length as the stem with the rear end of the rod terminating adjacent but outside of said loop and with the intermediate portion of the tensioning rod being permanently extended through and in frictional engagement with said eye, whereby to adjustably control the force required for sliding of said loop along said arms toward said eye.

2. The device as defined in claim 1 wherein said front end of said stem is provided with an eyelet for attachment to a fishing line, said tensioning rod being formed integrally with said stem as a continuation of the stem rearwardly beyond said eyelet.

References Cited by the Examiner
UNITED STATES PATENTS

| | | | |
|---|---|---|---|
| 2,209,300 | 7/1940 | Shipman | 43—36 |
| 2,550,376 | 4/1951 | Peterson | 43—36 |
| 2,817,179 | 12/1957 | Kelley | 43—36 |

ALDRICH F. MEDBERY, *Acting Primary Examiner.*

SAMUEL KOREN, *Examiner.*

D. J. LEACH, *Assistant Examiner.*